UNITED STATES PATENT OFFICE.

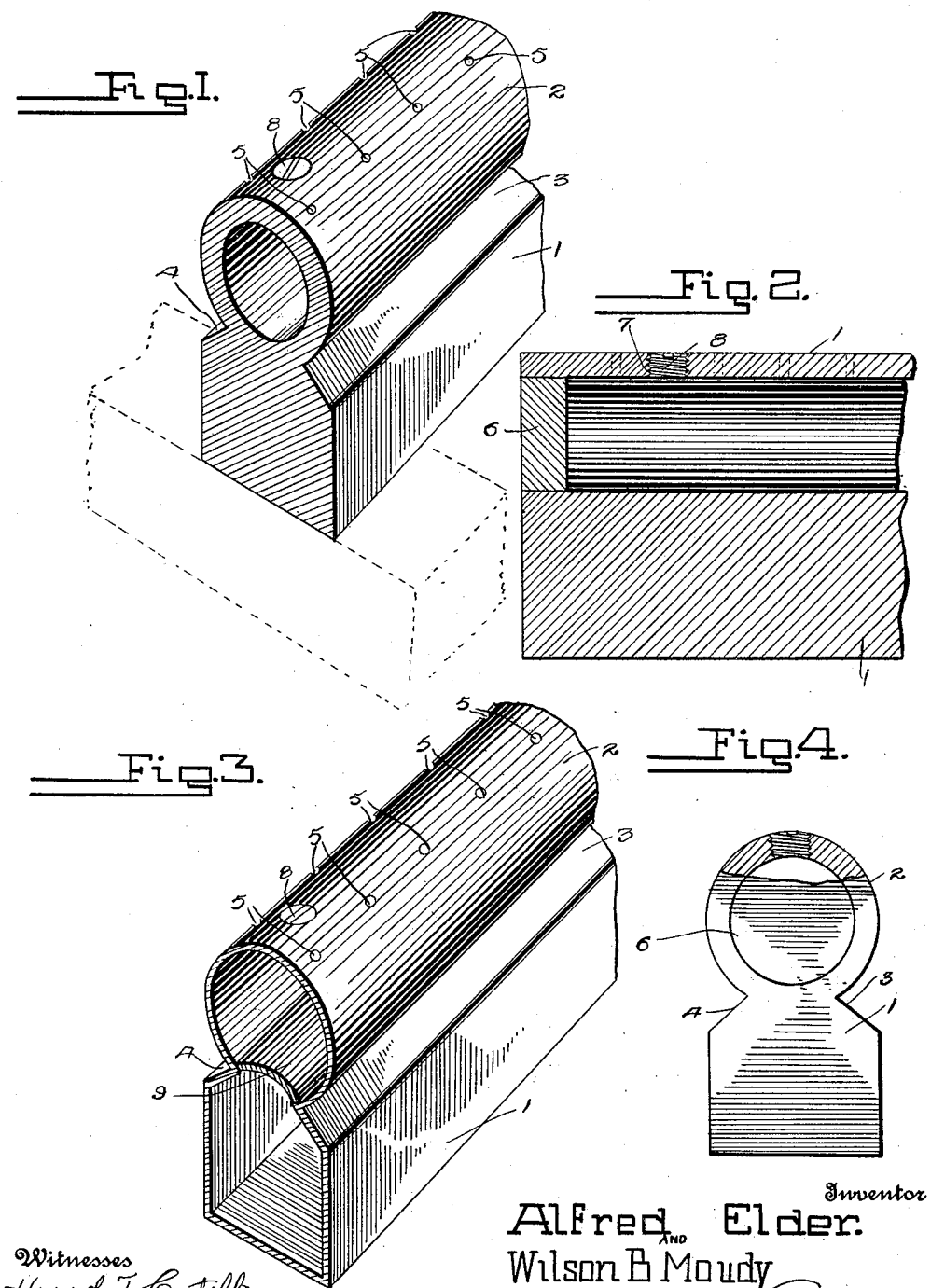

ALFRED ELDER, OF ARCHIE, AND WILSON B. MOUDY, OF HARRISONVILLE, MISSOURI.

CHICKEN-PERCH.

999,636.     Specification of Letters Patent.     Patented Aug. 1, 1911.

Application filed February 10, 1911. Serial No. 607,798.

*To all whom it may concern:*

Be it known that we, ALFRED ELDER and WILSON B. MOUDY, citizens of the United States, residing, respectively, at Archie and Harrisonville, in the county of Cass and State of Missouri, have invented certain new and useful Improvements in Chicken-Perches, of which the following is a specification, reference being had therein to the accompanying drawing.

This invention relates to perches and the principal object of the same is to so construct a perch that a disinfectant can be placed in the perch and the fumes from the disinfecting material permitted to pass out through the perch and kill any vermin which infest fowls resting upon the perch.

This invention is illustrated in the accompanying drawings, wherein:—

Figure 1 is a perspective view of the improved perch. Fig. 2 is a longitudinal sectional view through the perch. Fig. 3 is a modified form of perch showing the same formed from sheet metal. Fig. 4 is an end view of the perch.

It will be seen that the improved perch comprises a rectangular base 1 which extends the full length of the perch and is provided with a rounded upper portion 2. The upper edges 3 and 4 of the base 1 are sloping so that if any vermin drop from the fowls on to the upper edges of the perch they will fall off. The rounded upper portion 2 of the perch is hollow and is provided with a number of openings 5 formed in its upper portion to permit the fumes of the disinfecting material to pass out. Each end of the upper portion may be closed by a plug 6 which holds the disinfecting material in the perch and prevents the fumes from passing out through the ends of the perch. The disinfecting material is poured into the perch through an opening 7 formed in the upper portion of the perch and is closed by a screw 8. By having this inlet opening 7 positioned in the upper portion of the perch the disinfecting material can be poured in without removing the perch from its position, as would be necessary if the opening were made in the end of the perch. It should also be noted that if this opening were placed in the end of the perch and a liquid disinfectant were used that it would flow out through the openings in the upper portion of the perch as it would be necessary to tilt the perch in order to pour liquid in. With applicant's device however the disinfectant can be poured in and as the perch is horizontal, there is no danger of the disinfectant being wasted.

In Fig. 3 we have shown a slightly modified form of perch in which the perch is formed from sheet metal. This perch is constructed similar to the one shown in Fig. 1, the only different feature being that the perch is provided with an intermediate web 9 which is positioned in the bottom of the hollow body 2 and joins the upper edges of the sloping faces 3 and 4. This web 9 not only divides the perch into two parts, but also serves as a strengthening means to brace the perch.

Having described the invention what we claim is:—

1. A perch comprising a rectangular base extending the full length of the perch and provided with sloping upper faces, a hollow rest formed above said upper face, said rest being provided with openings through which disinfecting fumes may escape and with an opening for admitting disinfectant to the interior of said rest, and means for closing said inlet opening.

2. A perch comprising a rectangular base having sloping upper faces, a web connecting the upper edges of said sloping faces and serving to brace said perch, a hollow rest positioned above said web and connected with the upper edges of said sloping faces, said rest being provided with an inlet opening and with a plurality of outlet openings, and a closure for said inlet opening.

In testimony whereof we hereunto affix our signatures in presence of two witnesses.

ALFRED ELDER.
        WILSON B. MOUDY.

Witnesses:
  OSCAR W. BYRAM,
  JOHN C. BROAKHART.